United States Patent
Bu et al.

(10) Patent No.: US 8,589,329 B2
(45) Date of Patent: *Nov. 19, 2013

(54) METHOD AND APPARATUS FOR INCREMENTAL TRACKING OF MULTIPLE QUANTILES

(75) Inventors: Tian Bu, Basking Ridge, NJ (US); Jin Cao, Edison, NJ (US); Aiyou Chen, New Providence, NJ (US); Li Li, Edison, NJ (US)

(73) Assignee: Alcatel Lucent, Paris (FR)

(*) Notice: Subject to any disclaimer, the term of this patent is extended or adjusted under 35 U.S.C. 154(b) by 790 days.

This patent is subject to a terminal disclaimer.

(21) Appl. No.: 12/546,255

(22) Filed: Aug. 24, 2009

(65) Prior Publication Data

US 2011/0010327 A1    Jan. 13, 2011

Related U.S. Application Data

(60) Provisional application No. 61/224,704, filed on Jul. 10, 2009.

(51) Int. Cl.
- *G06F 17/00* (2006.01)
- *G06F 7/00* (2006.01)
- *G06F 7/60* (2006.01)
- *G06Q 10/00* (2012.01)

(52) U.S. Cl.
USPC ........... 706/50; 706/52; 707/609; 705/1.1; 703/2

(58) Field of Classification Search
None
See application file for complete search history.

(56) References Cited

U.S. PATENT DOCUMENTS

| | | | |
|---|---|---|---|
| 6,108,658 A * | 8/2000 | Lindsay et al. | 1/1 |
| 6,820,090 B2 * | 11/2004 | Chambers et al. | 1/1 |
| 7,076,487 B2 | 7/2006 | Liechty et al. | |
| 7,076,695 B2 | 7/2006 | McGee et al. | |
| 7,219,034 B2 * | 5/2007 | McGee et al. | 702/180 |
| 7,313,092 B2 | 12/2007 | Lau et al. | |
| 8,000,929 B2 | 8/2011 | Bakshi et al. | |
| 2008/0091691 A1 | 4/2008 | Tsuji | |
| 2009/0271508 A1 | 10/2009 | Sommers et al. | |
| 2010/0114526 A1 | 5/2010 | Hosking | |
| 2010/0292995 A1 | 11/2010 | Bu et al. | |

OTHER PUBLICATIONS

Moller et al., "Time-adaptive Quantile Regression", Jan. 2008, Computational Statistics & Data Analysis, vol. 52 Issue 3, pp. 1292-1303.*

Chambers et al., "Monitoring Networked Applications with Incremental Quantile Estimation", 2006, Statistical Science, vol. 21 No. 4, pp. 463-475.*

(Continued)

*Primary Examiner* — Alan Chen
*Assistant Examiner* — Paulinho E Smith
(74) *Attorney, Agent, or Firm* — Wall & Tong, LLP

(57) ABSTRACT

A capability for incremental tracking of multiples quantiles is provided. A method for performing an incremental quantile update using a data value of a received data record includes determining an initial distribution function, updating the initial distribution function to form a new distribution function based on the received data value, generating an approximation of the new distribution function, and determining new quantile estimates from the approximation of the new distribution function. The initial distribution function includes a plurality of initial quantile estimates and a respective plurality of initial probabilities. The new distribution function includes a plurality of quantile points identifying the respective initial quantile estimates and a respective plurality of new probabilities associated with the initial quantile estimates. The approximation of the new distribution function is generated by connecting pairs of adjacent quantile points using linear approximations of regions between the pairs of adjacent quantile points.

15 Claims, 8 Drawing Sheets

(56) References Cited

OTHER PUBLICATIONS

Jin Cao, et al., Incremental Tracking of Multiple Quantiles for Network Monitoring in Cellular Networks, MICNET '09, Sep. 21, 2009, Beijing, China.

Fei Chen et al., "Incremental Quantile Estimation for Massive Tracking," Proc. Of the Sixth International Conference on Knowledge Discovery and Data Mining, 2000, pp. 516-522.

John M. Chambers et al., "Monitoring Networked Applications with Incremental Quantile Estimation," Statistical Science, vol. 21, No. 4 (2006), pp. 463-475.

Ichiro Takeuchi et al., "Nonparametric Quantile Estimation," Journal of Machine Learning Research, vol. 7 (2006), pp. 1231-1264.

Anna C. Gilbert et al., "Domain-Driven Data Synopses for Dynamic Quantiles," IEEE Transactions on Knowledge and Data Engineering (Jul. 2005), 17(7):927-938.

* cited by examiner

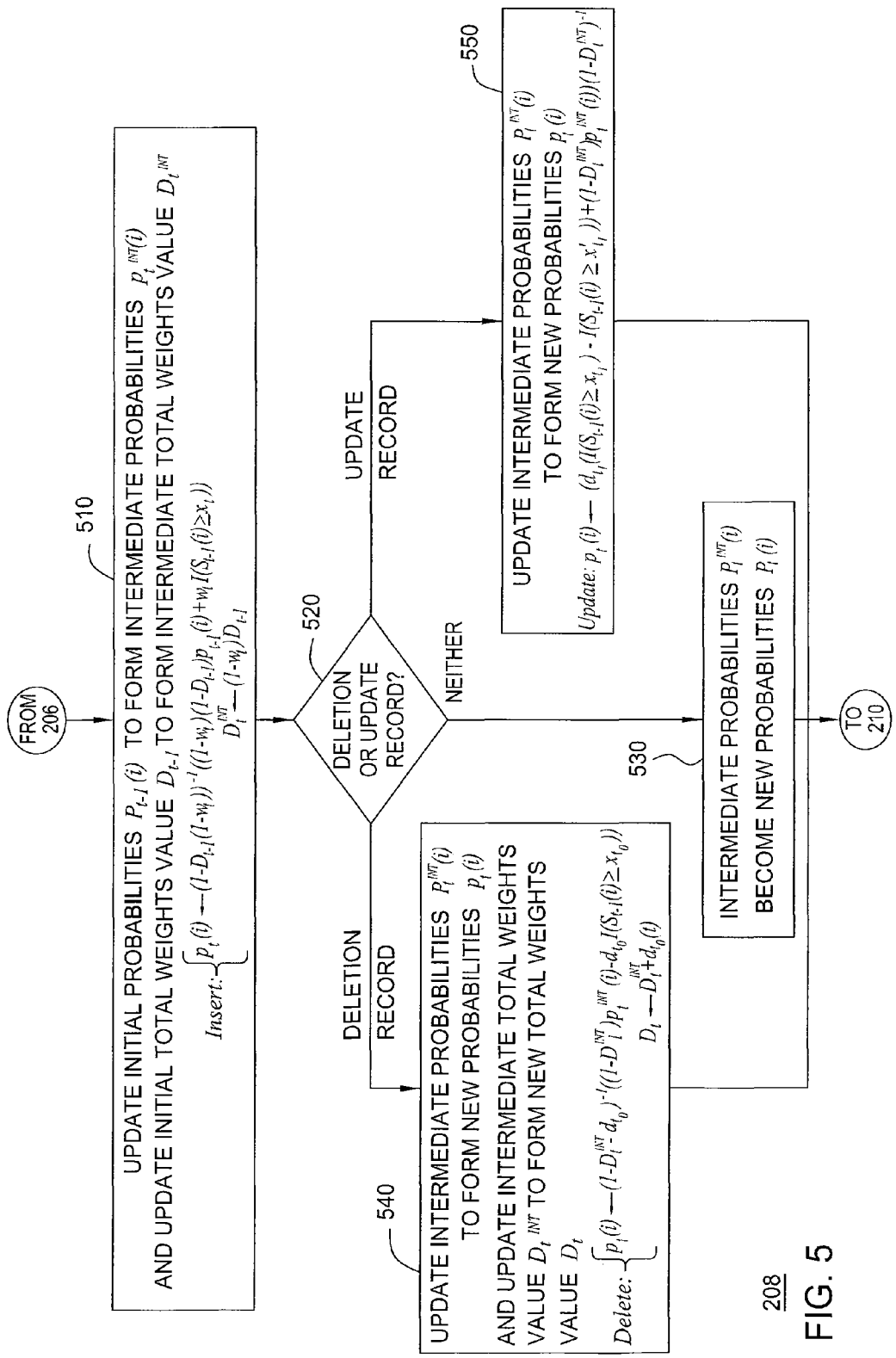

600

METHOD AND APPARATUS FOR INCREMENTAL TRACKING OF MULTIPLE QUANTILES

CROSS-REFERENCE TO RELATED APPLICATIONS

This application claims the benefit of U.S. Provisional Patent Application Ser. No. 61/224,704, filed Jul. 10, 2009, entitled "INCREMENTAL TRACKING OF MULTIPLE QUANTILES" which is hereby incorporated by reference herein in its entirety. This application is related to U.S. patent application Ser. No. 12/546,344, filed Aug. 24, 2009, entitled "METHOD AND APPARATUS FOR INCREMENTAL QUANTILE TRACKING OF MULTIPLE RECORD TYPES," which is hereby incorporated by reference herein in its entirety.

FIELD OF THE INVENTION

The invention relates to the field of quantile tracking and, more specifically but not exclusively, to incremental quantile tracking.

BACKGROUND

Quantiles are useful in characterizing the data distribution of evolving data sets. For example, quantiles are useful in many applications, such as in database applications, network monitoring applications, and the like. In many such applications, quantiles need to be tracked dynamically over time. In database applications, for example, operations on records in the database, e.g., insertions, updates, and deletions, change the quantiles of the data distribution. Similarly, in network monitoring applications, for example, anomalies on data streams need to be detected as the data streams change dynamically over time. Computing quantiles on demand is quite expensive, and, similarly, computing quantiles periodically can be prohibitively costly as well. Therefore, it is desirable to incrementally track quantiles of the data distribution.

Most incremental quantile estimation algorithms are based on a summary of the empirical data distribution, using either a representative sample of the distribution or a global approximation of the distribution. In such incremental quantile estimation algorithms, quantiles are computed from summary data. Disadvantageously, however, in order to obtain quantile estimates with good accuracies (especially for tail quantiles, for which the accuracy requirement tends to be higher than for non-tail quantiles), a large amount of summary information must be maintained, which tends to be expensive in terms of memory. Furthermore, for continuous data streams having underlying distributions that change over time, a large bias in quantile estimates may result since most of the summary information is out of date.

By contrast, other incremental quantile estimation algorithms use stochastic approximation (SA) for quantile estimation, in which the data is viewed as being quantities from a random data distribution. The SA-based quantile estimation algorithms do not keep a global approximation of the distribution and, thus, use negligible memory for estimating tail quantiles. Disadvantageously, however, the existing SA-based quantile estimation algorithms derive each quantile estimate individually, in isolation, which causes problems in incremental quantile estimation. First, derivation of the quantile estimates individually often leads to a violation of the monotone property of quantiles (e.g., such as where the value of the 90% quantile is less than the value of the 80% quantile). Second, although this incremental nature is amenable to continuous data updates, use of derivative information renders the SA-based quantile estimation algorithms sensitive to data order and the particular data distribution during intermediate updates. Third, the existing SA-based quantile estimation algorithms cannot handle dynamic underlying data distributions. These and other issues associated with existing SA-based quantile estimation algorithms present challenges for applications in which incremental quantile tracking is performed.

SUMMARY

Various deficiencies in the prior art are addressed via methods, apparatuses, and computer readable mediums for performing incremental quantile tracking of multiple quantiles using stochastic approximation.

In one embodiment, a method for performing an incremental quantile update using a data value of a received data record includes determining an initial distribution function, updating the initial distribution function to form a new distribution function based on the received data value, generating an approximation of the new distribution function, and determining new quantile estimates from the approximation of the new distribution function. The initial distribution function includes a plurality of initial quantile estimates and a respective plurality of initial probabilities associated with the initial quantile estimates. The initial distribution function is updated to form the new distribution function based on the received data value. The new distribution function includes a plurality of quantile points identifying the respective initial quantile estimates and a respective plurality of new probabilities associated with the respective initial quantile estimates. The approximation of the new distribution function is generated by, for each pair of adjacent quantile points in the new distribution function, connecting the adjacent quantile points using a linear approximation of the region between the adjacent quantile points. The new quantile estimates and the new probabilities associated with the new quantile estimates may then be stored.

BRIEF DESCRIPTION OF THE DRAWINGS

The teachings herein can be readily understood by considering the following detailed description in conjunction with the accompanying drawings, in which:

FIG. 5 depicts one embodiment of a method for updating an initial distribution function to form a new distribution function for multiple record types;

To facilitate understanding, identical reference numerals have been used, where possible, to designate identical elements that are common to the figures.

DETAILED DESCRIPTION

A capability for incremental tracking of quantiles using stochastic approximation (SA), denoted as an SA-based incremental quantile estimation capability, is depicted and described herein. In general, in incremental quantile estimation, the quantiles for a set of data are updated in real or near-real time as data is received, such that the incremental quantile estimation provides a relatively current estimate of the quantiles for the set of data received up to the current time. The SA-based incremental quantile estimation capability enables incremental tracking of multiple quantiles over time, where each of the quantile estimates is updated for each data record that is received, thereby ensuring that, at any given time, the monotone property of quantiles is maintained. The SA-based incremental quantile estimation capability enables incremental tracking of multiple quantiles for different record types, such as insertions, deletions, and updates. The SA-based incremental quantile estimation capability is adaptive to changes in the data distribution. The SA-based incremental quantile estimation capability only needs to track quantiles of interest and, thus, is memory efficient (as opposed to non-SA-based quantile estimation algorithms in which the memory requirements are dependent on which quantile is being estimated, e.g., tail quantiles require more memory).

Figure 1:
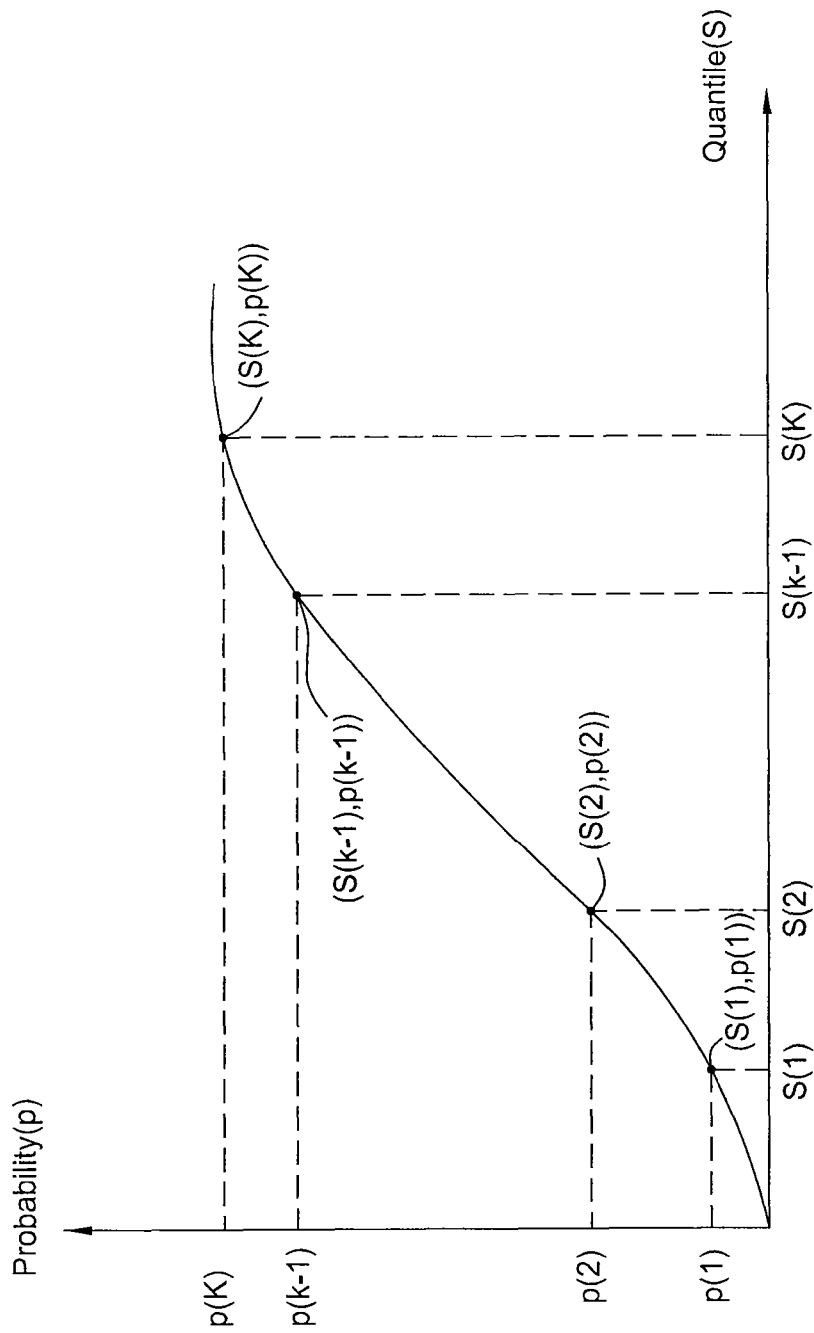
FIG. 1 depicts an exemplary estimated cumulative distribution function (CDF) for use in responding to queries for quantile estimates.

FIG. 1 depicts an exemplary estimated cumulative distribution function (CDF) for use in responding to queries for quantile estimates. The exemplary estimated CDF 100, denoted as distribution function $F(x)$, represents a distribution of a set of received data values $\{x\}$. The distribution function $F(x)$ is represented using a Cartesian coordinate system in which the x-axis indicates the values of the quantile estimates of the distribution function EQ (which are denoted as quantile estimates $S=(S(1), S(2), \ldots, S(K)))$ and the y-axis indicates the values of the probabilities associated with the quantile estimates S (which are denoted as probabilities $p=(p(1), p(2), \ldots, p(K)))$. A combination of the quantile estimates S and the associated probabilities p provides a set of quantile points which define the distribution function $F(x)$ (namely, distribution function $F(x)$ is represented using the quantile points $\{((S(1),p(1)), ((S(2),p(2)), \ldots, ((S(K),p(K)))$. The distribution function $F(x)$ is a strictly monotone function, such that $S(1)<S(2)<\ldots<S(K)$, and has positive derivatives on its domain.

The SA-based incremental quantile estimation capability incrementally tracks the estimated quantiles of distribution function $F(x)$ using incremental approximations to distribution function $F(x)$ upon receiving new data values. A current data value of a set of received data values $\{x\}$ is denoted as data value $x_t$ received at time t. The SA-based incremental quantile estimation capability updates the approximation to the distribution function $F(x)$ based on received data value $x_t$, such that the quantile estimates are denoted as $S_t=(S_t(1), S_t(2), \ldots, S_t(K)))$ and the probabilities associated with the quantile estimates $S_t$ are denoted as probabilities $p_t=(p_t(1), p_t(2), \ldots, p_t(K)))$. A method, according to one embodiment, for tracking the estimated quantiles of distribution function $F(x)$ using an incremental approximation to distribution function $F(x)$ upon new data arrivals is depicted and described with respect to FIG. 2-FIG. 5.

Figure 2:
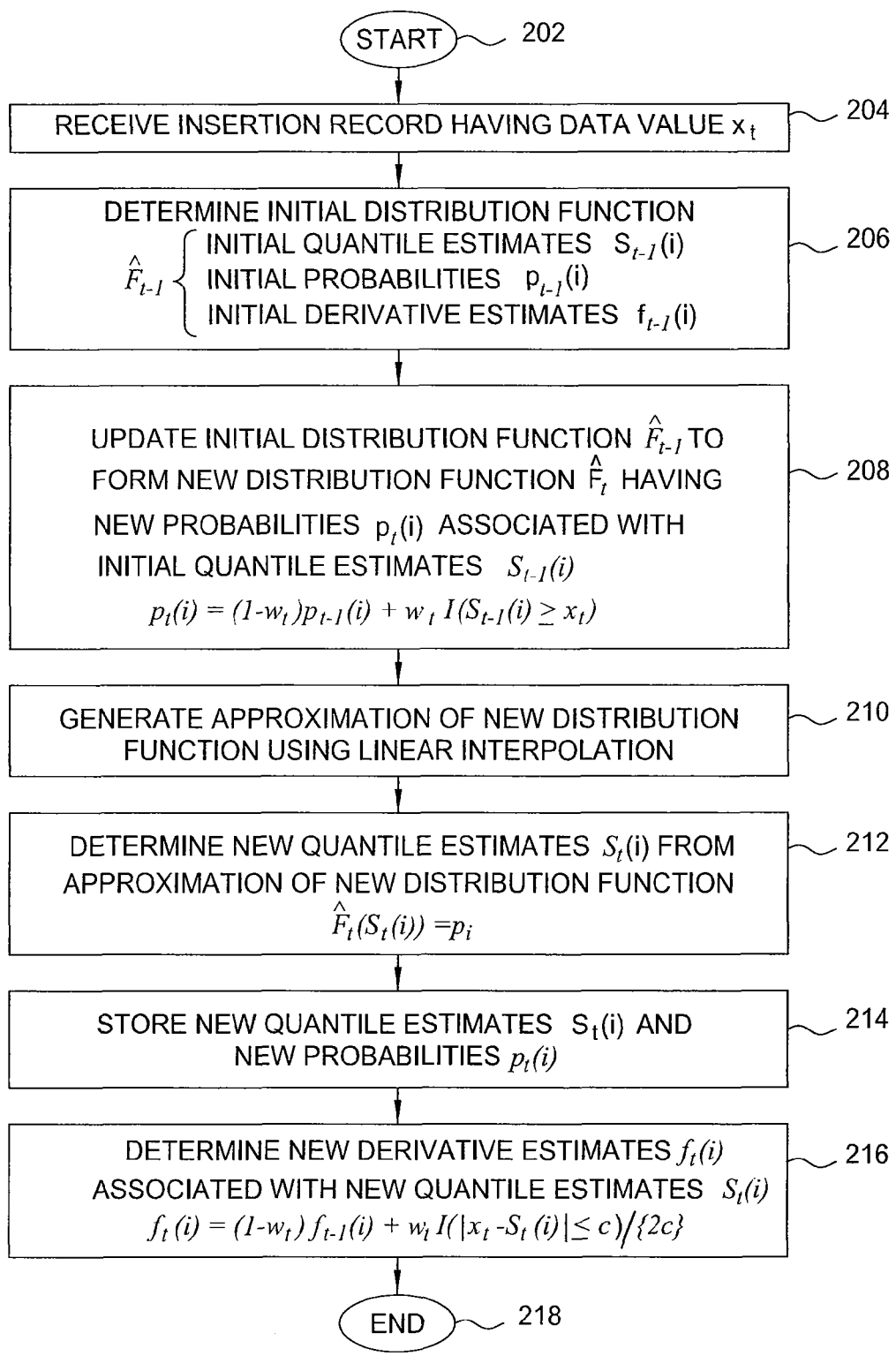
FIG. 2 depicts one embodiment of a method for incrementally tracking estimated quantiles of a data distribution for a single record type.

FIG. 2 depicts one embodiment of a method for incrementally tracking estimated quantiles of a data distribution for a single record type. The method 200 is performed for incrementally updating the estimated quantiles of a data distribution at a current time t at which a new data record is received. Although depicted and described as being performed serially, at least a portion of the steps of method 200 may be performed contemporaneously, or in a different order than depicted and described with respect to FIG. 2.

At step 202, the method 200 begins.

At step 204, an insertion record is received. The insertion record includes a new data value $x_t$. The new data value $x_t$ may be any suitable value and may be received in any suitable manner, which may depend, at least in part, on the application for which incremental tracking of estimated quantiles is performed (e.g., receiving a data insertion record for a database, receiving a data value in a data stream in a network, and the like).

At step 206, an initial distribution function (denoted as $\hat{F}_{t-1}$) is determined.

The initial distribution function $\hat{F}_{t-1}$ has properties similar to the distribution function $F(x)$ depicted and described with respect to FIG. 1. The initial distribution function $\hat{F}_{t-1}$ includes a plurality of initial quantile estimates ($S_{t-1}(i)$, $1 \leq i \leq K$) and a plurality of initial probabilities ($p_{t-1}(i)$, $1 \leq i \leq K$) associated with the respective initial quantile estimates $S_{t-1}(i)$. The initial distribution function also includes a plurality of initial derivative estimates ($f_{t-1}(i)$, $1 \leq i \leq K$) associated with the respective initial quantile estimates $S_{t-1}(i)$. In one embodiment, the initial distribution function $\hat{F}_{t-1}$ may be a distribution function initialized in a certain manner (e.g., the distribution function $\hat{F}_0$ at time t=0, where this is the first time that method 200 is being executed).

In one embodiment, the initial distribution function $\hat{F}_{t-1}$ may be the distribution function determined during a previous time (t−1) at which the previous data record was received (e.g., the initial distribution function $\hat{F}_{t-1}$ may be the approximation of the new distribution function determined during the previous execution of method 200 at previous time (t−1), where method 200 has already been executed for one or more previously received data records).

At step 208, the initial distribution function $\hat{F}_{t-1}$ is updated to form a new distribution function (denoted as $\hat{F}_t$) based on the new data value $x_t$.

The new distribution function $\hat{F}_t$ includes a plurality of new probabilities ($p_t(i)$, $1 \leq i \leq K$) associated with the initial quantile estimates $S_{t-1}(i)$ of the initial distribution function $\hat{F}_{t-1}$.

In one embodiment, the initial distribution function $\hat{F}_{t-1}$ is updated to form new distribution function $\hat{F}_t$ by determining the new probabilities $p_t(i)$ for the new distribution function $\hat{F}_t$ using $p_t(i)=(1-w_t)p_{t-1}(i)+w_t I(S_{t-1}(i) \geq x_t)$. In this equation, $x_t$ is the new data value, $w_t$ is a weight associated with the new data value $x_t$ (which may be chosen in any suitable manner), $S_{t-1}(i)$ are the initial quantile estimates of initial distribution function $\hat{F}_{t-1}$, $p_{t-1}(i)$ are the initial probabilities associated with initial quantile estimates $S_{t-1}(i)$, $I(S_{t-1}(i) \geq x_t)$ is an indicator function and i is a counter over the set of quantile estimates and probabilities ($1 \leq i \leq k$). This equation follows from updating initial distribution function $\hat{F}_{t-1}$ as $\hat{F}_t(x)=(1-w_t)\hat{F}_{t-1}(x)+w_t I(x \geq x_t)$, evaluating $\hat{F}_t(x)$ at initial quantile estimates $S_{t-1}(i)$ at time t−1, and, using the fact that $\hat{F}_{t-1}(S_{t-1}(i)) \approx p(i)$, thereby giving the equation: $\hat{F}_t(S_{t-1}(i)) \approx (1-w_t)p(i)+w_t I(S_{t-1}(i) \geq x_t)$, which may then be represented as $p_t(i)=(1-w_t)p(i)+w_t I(S_{t-1}(i) \geq x_t)$. The combination of the initial quantile estimates $S_{t-1}(i)$ and the new probabilities $p_t(i)$ provides a set of quantile points ($S_{t-1}(i), p_t(i)$) which defines new distribution function $\hat{F}_t$.

At step 210, an approximation of the new distribution function is generated.

In one embodiment, linear interpolation is used to generate the approximation of the new distribution function such that, in the neighborhood of each of the initial quantile estimates $S_{t-1}(i)$, the approximation of the new distribution function is a linear function with a slope specified by the respective initial derivative estimates $f_{t-1}(i)$ associated with the initial quantile estimate $S_{t-1}(i)$, and the linear points around the initial quantile estimates $S_{t-1}(i)$ are extended under the constraints of monotonicity of the interpolation function.

In one embodiment, generating the approximation of the new distribution function includes, for each pair of adjacent quantile points in the new distribution function $\hat{F}_t$ (where each pair of adjacent quantile points includes a first quantile point $(S_{t-1}(i), p_t(i))$ and a second quantile point $(S_{t-1}(i+1), p_t(i+1))$ performing the following: (1) defining a right quantile point to the right of the first quantile point and a left quantile point to the left of the second quantile point; and (2) generating a linear approximation of the new distribution function for the region between the adjacent quantile points by connecting the first quantile point, the right quantile point, the left quantile point, and the second quantile point in a piecewise linear fashion. In one such embodiment, definition of the right quantile points and the left quantile points is performed using the initial quantile estimates $S_{t-1}(i)$, the initial derivative estimates $f_{t-1}(i)$, the new probabilities $p_t(i)$, and monotonicity values $\Delta_t(i)$. A more detailed description of one such embodiment is depicted and described with respect to FIGS. 3A and 3B.

Figure 3A:
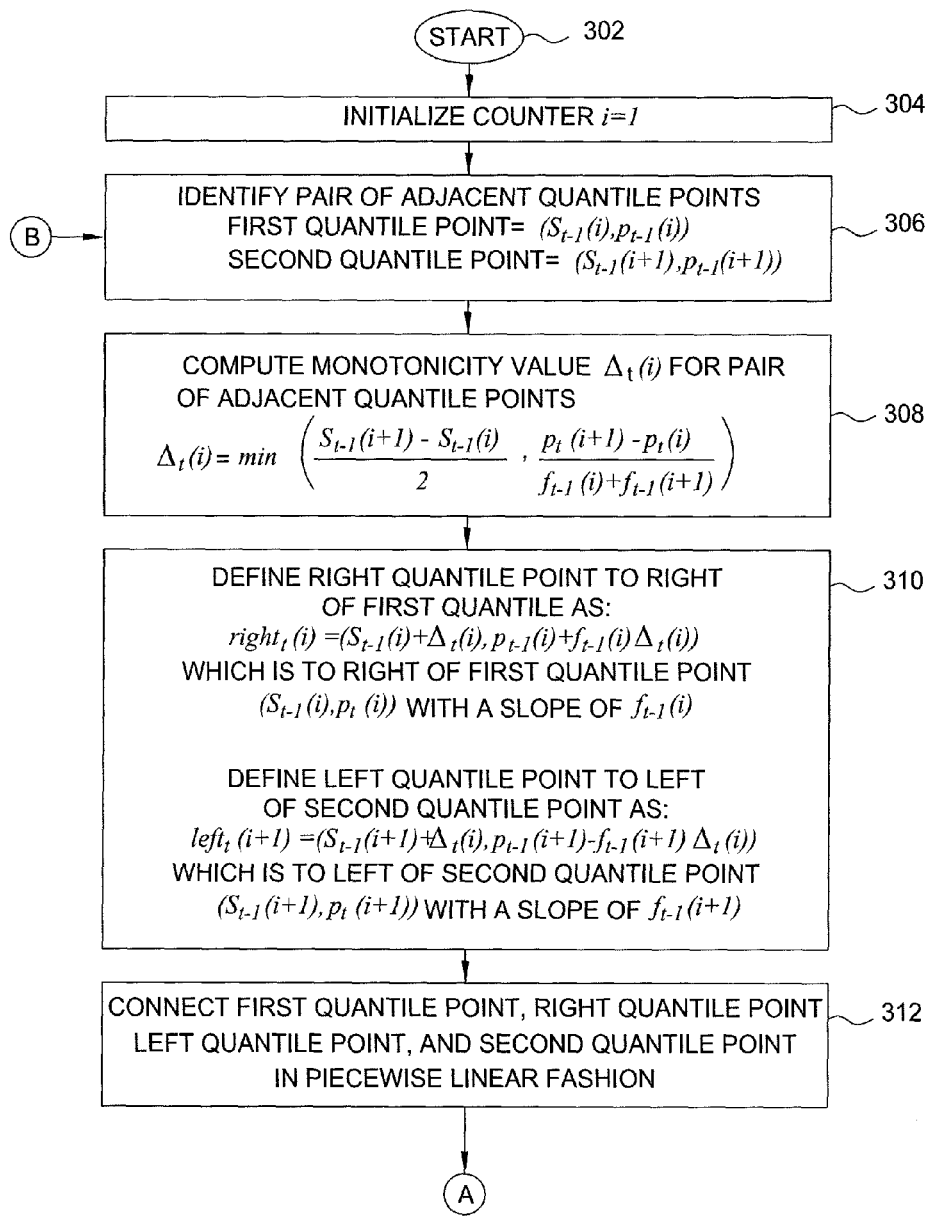
FIGS. 3A and 3B depicts one embodiment of a method for generating an approximation of a distribution function for use with the method depicted and described with respect to FIG. 2.
Figure 3B:
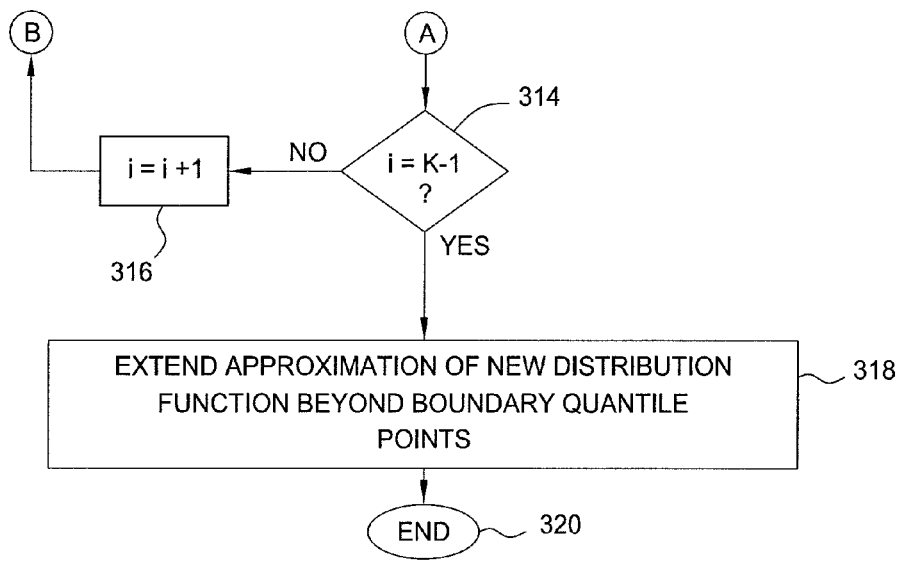

FIGS. 3A and 3B depicts one embodiment of a method for generating an approximation of a distribution function for use with the method depicted and described with respect to FIG. 2. As indicated above with respect to FIG. 2, in one embodiment method 300 of FIGS. 3A and 3B may be used as step 210 of method 200 of FIG. 2. Although primarily depicted and described as being performed serially, at least a portion of the steps of method 300 may be performed contemporaneously, or in a different order than depicted and described with respect to FIGS. 3A and 3B.

At step 302, method 300 begins.

At step 304, a counter associated with the quantile points is initialized to one (i=1, 1≤i≤K, where K is the number of estimated quantiles of the new distribution function).

At step 306, a pair of adjacent quantile points is determined. The pair of adjacent quantile points is determined based on the current value of the counter i. The pair of adjacent quantile points includes a first quantile point $(S_{t-1}(i), p_t(i))$ and a second quantile point $(S_{t-1}(i+1), p_t(i+1))$.

At step 308, a monotonicity value (denoted as $\Delta_t(i)$) is computed for the pair of adjacent quantile points.

The monotonicity value $\Delta_t(i)$ is computed such that the right quantile point and the left quantile point are non-decreasing, i.e., such that:

$$[S_{t-1}(i)+\Delta_t(i)] \leq [S_{t-1}(i+1)-\Delta_t(i)], \text{ and}$$

$$[p_t(i)+f_{t-1}(i)\Delta_t(i)] \leq [p_t(i+1)-f_{t-1}(i+1)\Delta_t(i)],$$

which indicate that:

$$\Delta_t(i) = \min\left(\frac{S_{t-1}(i+1)-S_{t-1}(i)}{2}, \frac{p_t(i+1)-p_t(i)}{f_{t-1}(i)+f_{t-1}(i+1)}\right).$$

The monotonicity value $\Delta_t(i)$ may be selected in any suitable manner. In one embodiment, for example, the monotonicity value $\Delta_t(i)$ is selected as the maximum possible value determined from the right-hand side of the above equation for monotonicity value $\Delta_t(i)$.

At step 310, the right quantile point (denoted as $\text{right}_t(i)$) and the left quantile point (denoted $\text{left}_t(i+1)$) are defined.

The right quantile point is a point to the right of the first quantile point, and is defined as follows: $\text{right}_t(i)=(S_{t-1}(i)+\Delta_t(i), p_t(i)+f_{t-1}(i)\Delta_t(i))$, which is a point in the new distribution function $\hat{F}_t$ that is to the right of the first quantile point $(S_{t-1}(i), p_t(i))$ with a slope of $f_{t-1}(i)$.

The left quantile point is a point to the left of the second quantile point, and is defined as follows: $\text{left}_t(i+1)=(S_{t-1}(i+1)-\Delta_t(i), p_t(i+1)-f_{t-1}(i+1)\Delta_t(i))$, which is a point in the new distribution function $\hat{F}_t$ that is to the left of the second quantile point $(S_{t-1}(i+1), p_t(i+1))$ with a slope of $f_{t-1}(i+1)$.

At step 312, the first quantile point, the right quantile point, the left quantile point, and the second quantile point are connected to form a portion of the approximation of the new distribution function. The first quantile point, the right quantile point, the left quantile point, and the second quantile point are connected in a piecewise linear fashion such that the first quantile point is connected to the right quantile point, the right quantile point is connected to the left quantile point, and the left quantile point is connected to the second quantile point.

At step 314, a determination is made as to whether counter i is equal to K−1. If the counter i is not equal to K−1, method 300 proceeds to step 316. If the counter i is equal to K−1, method 300 proceeds to step 318.

At step 316, the counter i is incremented by one (i=i+1), and, from step 316, method 300 returns to step 304 so that the process can be repeated for the next pair of adjacent quantile points in the new distribution function $\hat{F}_t$.

At step 318, the approximation of the new distribution function is extended beyond the two boundary quantile points until it reaches the extreme y-axis values of zero and one (i.e., the approximation of the new distribution function is extended to the left of the quantile point $(S_{t-1}(1), p_t(1))$ until it reaches the y-axis value of zero and is extended to the right of quantile point $(S_{t-1}(K), p_t(K))$ until it reaches the y-axis value of one).

At step 320, method 300 ends. Although depicted and described as ending (for purposes of clarity), in an embodiment in which method 300 is used as step 210 of method 200 of FIG. 2, processing will proceed to step 212 of method 200 of FIG. 2.

Figure 4A:
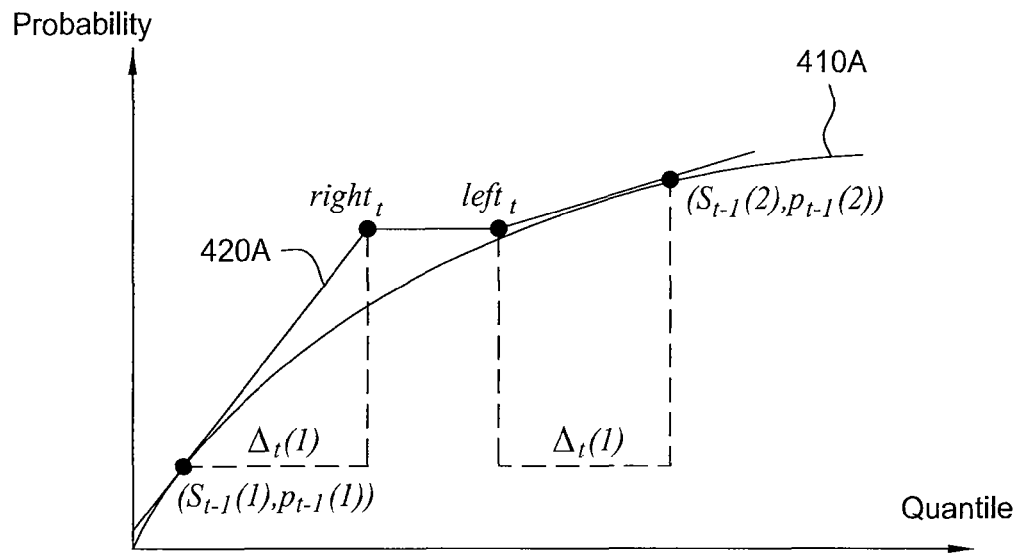
FIGS. 4A and 4B depict an approximation of a distribution function for one pair of adjacent quantile points using the method depicted and described with respect to FIGS. 3A and 3B.
Figure 4B:
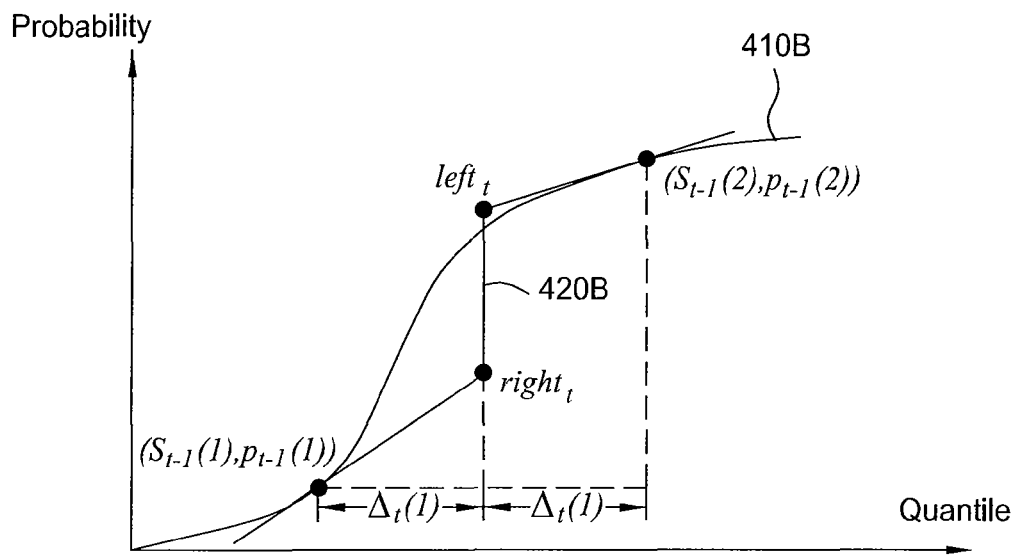

FIGS. 4A and 4B depict an approximation of a distribution function for one pair of adjacent quantile points using method 300 depicted and described with respect to FIGS. 3A and 3B.

As depicted in FIGS. 4A and 4B, the approximation of the new distribution function is depicted for the portion of the new distribution function that is between first quantile point $(S_{t-1}(1), p_t(1))$ and second quantile point $(S_{t-1}(2), p_t(2))$. As described hereinabove, similar approximations are performed for each of the other adjacent quantile points in the new distribution function (e.g., for second quantile point $(S_{t-1}(2), p_{t-1}(2))$ and third quantile point $(S_{t-1}(3), p_{t-1}(3))$, . . . , for next-to-last quantile point $(S_{t-1}(K-1), p_{t-1}(K-1))$ and last quantile point $(S_{t-1}(K), p_{t-1}(K))$) for purposes of generating the complete approximation of the new distribution function.

In FIGS. 4A and 4B, the depicted portion of the approximation of the new distribution function is plotted using a Cartesian coordinate system in which the x-axis indicates the values of the initial quantile estimates $S_{t-1}$ and the y-axis indicates the values of the new probabilities $p_t$ associated with the initial quantile estimates $S_{t-1}$.

The curve functions 410A and 410B represent the hypothetical smooth approximation of the data distribution of new distribution function $\hat{F}_t$ between first quantile point $(S_{t-1}(1), p_t(1))$ and second quantile point $(S_{t-1}(2), p_t(2))$.

The linear functions 420A and 420B represent the piecewise linear approximations of the new distribution function i; between first quantile point $(S_{t-1}(1), p_t(1))$ and second quantile point $(S_{t-1}(2), p_t(2))$, determined using first and second quantile points $(S_{t-1}(1), p_t(1))$ and $(S_{t-1}(2), p_t(2))$, initial derivative estimates $f_{t-1}(1)$ and $f_{t-1}(2)$ associated with first and second quantile points $(S_{t-1}(1), p_t(1))$ and $(S_{t-1}(2), p_t(2))$, respectively, and monotonicity value $\Delta_t(1)$.

FIGS. 4A and 4B correspond to two different cases for the monotonicity value $\Delta_t(1)$. FIG. 4A illustrates an exemplary case in which monotonicity value $\Delta_t(1)$ takes the second value in the monotonicity equation. FIG. 4B illustrates an exemplary case in which monotonicity value $\Delta_t(1)$ takes the first value in the monotonicity equation.

Returning now to FIG. 2, new quantile estimates, based upon the new data value $x_t$, are determined using the approximation of the new distribution function.

At step 212, new quantile estimates (denoted as $S_t(i)$) are determined from the approximation of the new distribution function. The new quantile estimates $S_t(i)$ are determined from the approximation of the new distribution function as follows: $\hat{F}_t(S_t(i))=p_i$.

At step 214, the new quantile estimates $S_t(i)$ and the new probabilities $p_t(i)$ of the approximation of the new distribution function are stored. The new quantile estimates $S_t(i)$ and the new probabilities $p_t(i)$ may be stored in any suitable manner.

In one embodiment, for example, the new quantile estimates $S_t(i)$ and the new probabilities $p_t(i)$ may be stored as respective sets of data values (namely, as a set of new quantile estimates $S_t(i)=\{S_t(1), \ldots, S_t(K)\}$ and a set of new probabilities $p_t(i)=\{p_t(1), \ldots, p_t(K)\}$.

In one embodiment, for example, the new quantile estimates $S_t(i)$ and the new probabilities $p_t(i)$ may be stored by storing the approximation of the new distribution function.

The storage of new quantile estimates $S_t(i)$ and new probabilities $p_t(i)$ of the new distribution function enables queries for quantile estimates $S_t(i)$ to be answered. A method according to one embodiment for responding to queries of quantile estimates using the approximation of the new distribution function is depicted and described with respect to FIG. 6.

At step 216, new derivative estimates (denoted as $f_t(i)$) associated with new quantile estimates $S_t(i)$ are determined.

In one embodiment, new derivative estimates $f_t(i)$ may be determined as follows: $f_t(i)=(1-w_t)f_{t-1}(i)+w_t I(|x_t-S_t(i)|\leq c/\{2c\})$, where c is a tunable parameter representing the window size around each of the new quantile estimates $S_t(i)$ for which the respective new derivative estimates $f_t(i)$ are determined. The window sizes c may be set to any suitable values. In one embodiment, for example, the window sizes c each are a fraction of the estimated inter-quantile range, and the window sizes c are the same for all quantiles. In another embodiment, for example, the values of window sizes c are set such that the window sizes c are not uniform across all quantiles.

It will be appreciated that, since the new derivative estimates $f_t(i)$ are not required for use in responding to queries for quantile estimates $S_t(i)$, determining the new derivative estimates may be viewed as an extraneous step performed for purposes of executing method 200 for each received data value. In one embodiment, as depicted in FIG. 2, this step may be considered as a post-processing step (e.g., performed after the approximation of the new distribution function is determined in order to obtain the derivative estimates associated with current time t which are to be used as the initial derivative estimates the next time method 200 is executed). In one embodiment, not depicted in FIG. 2, this step may be considered as a pre-processing step (e.g., performed before the initial distribution function is determined in order to obtain the derivative estimates associated with current time t which are to be used as the initial derivative estimates the next time method 200 is executed).

At step 218, method 200 ends.

Although depicted and described as ending (for purposes of clarity), it will be appreciated that method 200 may be executed for each new insertion record that is received for purposes of incrementally updating quantile estimates.

The SA-based incremental quantile estimation capability depicted and described herein enables incremental tracking of multiple quantiles over time for data with stationary distributions and data with non-stationary distributions. Additionally, the SA-based incremental quantile estimation capability depicted and described herein may utilize multiple types of weights $w_t$ in updating the initial distribution function to form the new distribution function. For example, the weights $w_t$ may be diminishing (e.g., $w_t=1/t$) or constant ($w_t=w$), or set in any other suitable manner.

For stationary data (i.e., $\hat{F}_t$ is stationary), simple SA-based algorithms, in which each of the quantile estimates is updated individually in isolation, will lead to convergence for both of the types of weights $w_t$ described above. For diminishing weights $w_t$ set as $w_t=1/t$, convergence using simple SA-based algorithms is to the true quantile in probability one. For constant weights $w_t$ set as $w_t=w$, convergence using simple SA-based algorithms is in distribution to a random variable with mean of the true quantile. These convergence results also are true for the SA-based incremental quantile estimation capability depicted and described herein in which each of the quantile estimates is updated for each received data record. For weights $w_t$ set as $w_t=1/t$, as t approaches infinity, the SA-based incremental quantile estimations depicted and described herein will converge to true quantiles. For weights $w_t$ set as $w_t=w$, as t approaches infinity, the SA-based incremental quantile estimations depicted and described herein will converge in distribution to a random variable with mean of the true quantile. In one embodiment, for non-stationary data (i.e., $\hat{F}_t$ is non-stationary), the SA-based incremental quantile estimations depicted and described herein will use constant weights ($w_t=w$) as opposed to diminishing weights ($w_t=1/t$).

It will be appreciated that the weights $w_t$ used in updating the initial distribution function to form the new distribution function, as depicted and described with respect to FIG. 2, may be set in any other suitable manner.

Although primarily depicted and described herein with respect to an embodiment in which estimated quantiles are updated for each new insertion record that is received (i.e., method 200 is executed for each new data value $x_t$ that is received), in other embodiments estimated quantiles may be updated using a batch of M insertion records (i.e., a batch of M data values $\{x_t\}_M$). In one such embodiment, steps 204-208 are performed for each of the M data values, and then steps 210-214 are performed once for the batch of M data values using the new distribution function that reflects the M data values. It will be appreciated that method 200 of FIG. 2 may be modified in other ways to support batch processing of data records.

The SA-based incremental quantile estimation capability uses an incremental distribution approximation by interpolating at the updated quantile points. As a result, local to the quantile points the incremental distribution approximation is the same linear function as in existing SA-based quantile estimation algorithms in which each quantile point is updated individually in isolation from other quantile points, whereas globally the incremental distribution approximation is an increasing function.

The SA-based incremental quantile estimation capability opens up the possibility of using other more elaborate interpolation or approximation schemes given the local approximations at the quantile points. The SA-based incremental quantile estimation capability also opens up the possibility of using an asymptotic model to overcome some of the instabilities of SA-based incremental quantile estimation schemes in dealing with extreme tails (e.g., due to very small derivatives associated with extreme tails). It will be appreciated that care must be taken to ensure that utilizing such interpolation or approximation schemes does not lead to biases in quantile estimates (e.g., such as where using linear interpolation by connecting quantile points directly without using the local derivatives provides convergence for stationary data, but with a bias).

The SA-based incremental quantile estimation capability enables the updated quantile estimates to be computed relatively efficiently, while at the same time providing good approximations of quantile estimates.

It will be appreciated that, since the distribution approximation is piecewise linear, finding the quantile points of the function for updating (as in step 212) is relatively simple (e.g., by determining which line segment each probability p(i) falls into and then solving p(i) for that line segment).

It will be further appreciated that the estimated derivative $f_t$ is a vector of estimated derivatives (density) and that it is not crucial to obtain exact values of the derivatives. For example, if estimated derivative $f_t$ is replaced by a vector of fixed positive constants, the quantile estimates derived using the SA-based incremental quantile estimation capability still provide good approximations; however, it is more efficient to use a value of estimated derivative $f_t$ that is close to the actual derivatives of the distribution function since the quantile estimates will stabilize faster around the true value.

Although primarily depicted and described herein with respect to embodiments in which the SA-based incremental quantile estimation capability is utilized for incrementally approximating a distribution function $F_t(\cdot)$ that is a strictly increasing continuous distribution, other embodiments of the SA-based incremental quantile estimation capability may be utilized for incrementally approximating a distribution function $F_t(\cdot)$ that is a discrete distribution. In such embodiments, the SA-based incremental quantile estimation capability may be modified in order to prevent the derivative estimates from becoming infinite. The SA-based incremental quantile estimation capability may be modified in any suitable manner (e.g., by adding a small random noise to the data, where the small random noise may be chosen in a data dependent fashion).

Although primarily depicted and described herein with respect to embodiments in which the SA-based incremental quantile estimation capability is used for a set of data records including only one specific record type (namely, for insertion records), the SA-based incremental quantile estimation capability also may be used for a set of data records including only one specific record type where the one specific record type is different (e.g., using deletion records, update records, and the like) and/or for a set of data records including multiple record types (e.g., using a combination of two or more of insertion records, deletion records, update records, and the like). A description of such embodiments follows.

In one embodiment, the SA-based incremental quantile estimation capability is used for a set of data records including multiple record types. As described herein, the SA-based incremental quantile estimation capability is, in general, based on performing incremental approximations to a distribution function and, thus, the manner depicted and described hereinabove for performing incremental approximations to a distribution function for a set of data records including a single record type (namely, insertion records) is modified to perform incremental approximations to a distribution function for a set of data records including multiple records types. A description of the modification follows.

In this embodiment, assume that the set of data records for which incremental quantile approximation is performed includes insertion records, deletion records, and updated records.

In this embodiment, assume that at time t there is always a data value $x_t$ inserted, but at the same time there also could be: (1) a data value $x_{t_0}$ from a previous time that will be deleted (i.e., the data value is no longer to be considered), or (2) a data value $x_{t_1}$ a previous time that will be updated with a new value $x'_{t_1}$ (i.e., the data sample at time $t_1$ should be replaced by $x'_{t_1}$).

In this embodiment, let $w_t$ be a sequence of intended or initial weights for the insertion data value $x_t$ at time t. The weights for the insertion data value $x_t$ are deemed to be intended or initial, because the actual weights for the insertion data value $x_t$ will be modified due to deletion. For deletion data value $x_{t_0}$, the intended weight at time t is: $d_{t_0}(t) = w_{t_0} \Pi'_{s=t_0+1}(1-w_s)$.

In this embodiment, assume that the approximation of the distribution function at time t−1 is denoted as $\hat{F}_{t-1}$. Additionally, define total weights value $D_0=0$. The approximation of the distribution function at time t−1 is the initial distribution function $\hat{F}_{t-1}$ at time t (similar to step 206 described with respect to FIG. 2 in the single-record-type case). The initial distribution function $\hat{F}_{t-1}$ is updated to form the new distribution function $\hat{F}_t$ by updating initial probabilities $p_{t-1}(i)$ to form new probabilities $p_t(i)$ (similar to step 208 described with respect to FIG. 2 in the single-record-type case). Additionally, the initial total weights value $D_{t-1}$ is updated to form new total weights value $D_t$.

At time t, with the insertion record including insertion data value $x_t$, updating of the initial distribution function $\hat{F}_{t-1}$ and the initial total weights value $D_{t-1}$ may be represented as follows:

$$\text{Insert:} \begin{cases} \hat{F}_t(x) \leftarrow \dfrac{(1-w_t)(1-D_{t-1})\hat{F}_{t-1}(x) + w_t I(x \geq x_t)}{1-D_{t-1}(1-w_t)} \\ D_t \leftarrow (1-w_t)D_{t-1} \end{cases}$$

If there are no deletion or update records at time t, the updating of the initial distribution function $\hat{F}_{t-1}$ is complete (because no further update of the initial distribution function $\hat{F}_{t-1}$ is required at time t).

If there is a deletion record or an update record at time t, the updated distribution function $\hat{F}_t$ that is generated based on the insertion record is further updated to account for the deletion or insertion.

At time t, if there is a deletion record indicating deletion of data value $x_{t_0}$, then: (a) the updated distribution function $\hat{F}_t$ that is generated based on the insertion data value from the insertion record is further updated based on the deletion record in order to represent the new distribution function $\hat{F}_t$, and (b) the updated total weights value $D_t$ that is generated based on the weight of the insertion data value from the insertion record is further updated based on the deletion record in order to represent the new total weights value $D_t$. The further updating of the updated distribution function $\hat{F}_t$ and the updated total weights value $D_t$ based on the deletion record may be represented as follows:

$$\text{Delete:} \begin{cases} \hat{F}_t(x) \leftarrow \dfrac{(1-D_t)F_t(x) - d_{t_0}I(x \geq x_{t_0})}{1 - D_t - d_{t_0}} \\ D_t \leftarrow D_t + d_{t_0}(t) \end{cases}$$

where $d_{t_0}(t)$ is determined as $d_{t_0}(t) = w_{t_0} \Pi'_{s=t_0+1}(1-w_s)$. It will be appreciated that these deletion equations remove the influence of deletion data value $x_{t_0}$ at time t since the weight for $x_{t_0}$ now reduces to $d_{t_0}(t)$.

At time t, if there is an update record indicating update of data value $x_{t_1}$ time t with a new value $x'_{t_1}$, then: (a) the updated distribution function $\hat{F}_t$ that is generated based on the insertion data value from the insertion record is further updated based on the update record in order to represent the new distribution function $\hat{F}_t$, and (b) the updated total weights value $D_t$ that is generated based on the weight of the insertion data value from the insertion record remains unchanged. The further updating of the updated distribution function $\hat{F}_t$ based on the update record may be represented as follows:

$$\text{Update:} \begin{cases} \hat{F}_t(x) \leftarrow \dfrac{(1-D_t)F_t(x) + d_{t_1}\left(I(x \geq x_{t_1}) - I(x \geq x'_{t_1})\right)}{1 - D_t} \\ D_t \quad \text{remains unchanged} \end{cases}$$

It will be appreciated from these update equations that an update record is treated as a combination of a deletion record and an insertion record for time t (i.e., the data value to be updated is deleted and replaced with the new value).

In the above-defined equations for insertion, deletion, and update records, the total weights value $D_t$ represents the total of all weights from data values deleted at time t. As such, the total weights of data that contributed to updated distribution function $\hat{F}_t$ at time t is not one, but, rather, is $1-D_t$ due to deletions.

For the insertion equations, with the arrival of new data value $x_t$, the updated distribution function $\hat{F}_t$ is the weighted sum $I(x \geq x_{t-1})$ from insertion data value $x_t$ with weight $w_t$, and initial distribution function $\hat{F}_{t-1}$ with weight $(1-w_t)(1-D_{t-1})$, normalized to have a total weight of one. Additionally, the weight of the deleted data in $\hat{F}_t$ is updated by a factor of ($131$ $w_t$).

As described hereinabove, from the above-described equations, the equations adapted for use in updating the initial probabilities $p_{t-1}(i)$ to form the new probabilities $p_t(i)$ may be derived. Namely, the equations adapted for use in updating the initial probabilities $p_{t-1}(i)$ to form the new probabilities $p_t(i)$ may be derived by evaluating the new distribution function $\hat{F}_t$ at each of the initial quantile estimates $S_{t-1}(i)$ at time $t-1$.

The initial probabilities $p_{t-1}(i)$ are updated to form the new probabilities $p_t(i)$ (similar to step 208 described with respect to FIG. 2 in the single record type case) as follows (where an assumption is made that initial total weights value $D_0=0$).

At time t, with the insertion record including insertion data value $x_t$: (a) the initial probabilities $p_{t-1}(i)$ are updated to form intermediate probabilities $p_t^{INT}(i)$ and (b) and the initial total weights value $D_{t-1}$ is updated to form an intermediate total weights value $D_t^{INT}$, as follows:

$$\text{Insert:} \begin{cases} p_t^{INT}(i) \leftarrow (1 - D_{t-1}(1-w_t))^{-1}((1-w_t)(1-D_{t-1})p_{t-1}(i) + \\ \qquad\qquad w_t I(S_{t-1}(i) \geq x_t)) \\ D_t^{INT} \leftarrow (1-w_t)D_{t-1} \end{cases}$$

If there are no deletion or update records at time t, the intermediate probabilities $p_t^{INT}(i)$ are denoted as new probabilities $p_t(i)$ (because no further update of the probabilities is required at time t).

If there is a deletion record or an update record at time t, the intermediate probabilities $p_t^{INT}(i)$ are further updated, based on the deletion or update record, in order to determine new probabilities $p_t(i)$.

At time t, if there is a deletion record indicating deletion of data value $x_{t_0}$, then: (a) the intermediate probabilities $p_t^{INT}(i)$ determined based on the insertion record are further updated based on the deletion record in order to determine new probabilities $p_t(i)$, and (b) the intermediate total weights value $D_t^{INT}$ that is generated based on the weight of the insertion data value from the insertion record is further updated based on the deletion record in order to determine the new total weights value $D_t$. The further updating of the intermediate probabilities $p_t^{INT}(i)$ and the intermediate total weights value $D_t^{INT}$ based on the deletion record is performed as follows:

$$\text{Delete:} \begin{cases} p_t(i) \leftarrow (1 - D_t^{INT} - d_{t_0})^{-1}((1 - D_t^{INT})p_t^{INT}(i) - \\ \qquad\qquad d_{t_0}I(S_{t-1}(i) \geq x_{t_0})) \\ D_t \leftarrow D_t^{INT} + d_{t_0}(t) \end{cases}$$

where $d_{t_0}(t)$ is $d_{t_0}(t) = w_{t_0} \Pi'_{s=t_0+1}(1-w_s)$.

At time t, if there is an update record indicating update of data value $x_{t_1}$ at time t with a new value $x'_{t_1}$, then: (a) the intermediate probabilities $p_t^{INT}(i)$ determined based on the insertion record are further updated based on the update record in order to determine new probabilities $p_t(i)$, and (b) the updated total weights value $D_t$ that is generated based on the weight of the insertion data value from the insertion record remains unchanged. The further updating of the intermediate probabilities $p_t^{INT}(i)$ based on the update record is performed as follows:

Update: $p_t(i) \leftarrow (d_{t_1}(I(S_{t-1}(i) \geq x_{t_1}) - I(S_{t-1}(i) \geq x'_{t_1})) + (1 - D_t^{INT})p_t^{INT}(i))(1 - D_t^{INT})^{-1}$.

As described herein, the single-record-type case for incrementally tracking estimated quantiles of a data distribution (depicted and described with respect to FIG. 2) may be modified to provide the multiple-record-type case for incrementally tracking estimated quantiles of a data distribution (depicted and described with respect to FIG. 5). In one embodiment, this is achieved by modifying step 208 of FIG. 2 for the multiple-record-type case. An exemplary embodiment for updating the initial distribution function to form the new distribution function, for the multiple-record-type case, is depicted and described with respect to FIG. 5.

FIG. 5 depicts one embodiment of a method for updating an initial distribution function to form a new distribution function in the presence of multiple record types. As noted above, the exemplary method depicted and described with respect to FIG. 5 is suitable for use as step 208 of FIG. 2. Although depicted and described as being performed serially, at least a portion of the steps of method 208 may be performed contemporaneously, or in a different order than depicted and described with respect to FIG. 5.

As depicted in FIG. 5, method 208 is entered from step 206 of method 200 (at which point the initial distribution function is determined) and exits to step 210 of method 200 (at which point an approximation of the determined new distribution function is generated using linear interpolation). A description of method 208 follows.

At step 510, the initial probabilities $p_{t-1}(i)$ associated with the initial quantile estimates $S_{t-1}(i)$ of initial distribution function $\hat{F}_{t-1}$ are updated to form intermediate probabilities $p_t^{INT}(i)$ and the initial total weights value $D_{t-1}$ is updated to form an intermediate total weights value $D_t^{INT}$. The intermediate probabilities $p_t^{INT}(i)$ and intermediate total weights value $D_t^{INT}$ are determined as follows:

$$\text{Insert:} \begin{cases} p_t^{INT}(i) \leftarrow (1 - D_{t-1}(1 - w_t))^{-1}((1 - w_t)(1 - D_{t-1})p_{t-1}(i) + \\ \qquad w_t I(S_{t-1}(i) \geq x_t)) \\ D_t^{INT} \leftarrow (1 - w_t)D_{t-1} \end{cases}$$

At step 520, a determination is made as to whether a deletion record or an update record has been received along with the insertion record. If neither a deletion record nor an update record has been received (i.e., only an insertion record was received at time t), method 500 proceeds to step 530. If a deletion record was received at time t, method 500 proceeds to step 540. If an update record was received at time t, method 500 proceeds to step 550.

At step 530, since only an insertion record was received at time t, the intermediate probabilities $p_t^{INT}(i)$ determined in step 510 become the new probabilities $p_t(i)$ associated with initial quantile estimates $S_{t-1}(i)$ to form thereby new distribution function $\hat{F}_t$, and the intermediate total weights value $D_t^{INT}$ determined in step 510 becomes the new total weights value $D_t$.

At step 540, since a deletion record was received in addition to the insertion record: (a) the intermediate probabilities $p_t^{INT}(i)$ determined in step 510 are updated again to become the new probabilities $p_t(i)$ associated with initial quantile estimates $S_{t-1}(i)$ to form thereby new distribution function $\hat{F}_t$, and (b) the intermediate total weights value $D_t^{INT}$ determined in step 510 is updated again to become new total weights value $D_t$. The new probabilities $p_t(i)$ and new total weights value $D_t$ are determined as follows:

$$\text{Delete:} \begin{cases} p_t(i) \leftarrow (1 - D_t^{INT} - d_{t_0})^{-1}((1 - D_t^{INT})p_t^{INT}(i) - \\ \qquad d_{t_0} I(S_{t-1}(i) \geq x_{t_0})) \\ D_t \leftarrow D_t^{INT} + d_{t_0}(t) \end{cases}$$

where $d_{t_0}(t)$ is $d_{t_0}(t) = w_{t_0} \Pi'_{s=t_0+1}(1 - w_s)$.

At step 550, since an update record was received in addition to the insertion record, the intermediate probabilities $p_t^{INT}(i)$ that were determined in step 510 are updated again to become the new probabilities $p_t(i)$ associated with initial quantile estimates $S_{t-1}(i)$ to form thereby new distribution function $\hat{F}_t$. As described hereinabove, the intermediate probabilities $p_t^{INT}(i)$ are updated based on the update record as follows:

Update: $p_t(i) \leftarrow (d_{t_1}(I(S_{t-1}(i) \geq x_{t_1}) - I(S_{t-1}(i) \geq x'_{t_1})) + (1 - D_t^{INT})p_t^{INT}(i))(1 - D_t^{INT})^{-1}$.

As depicted in FIG. 5, the result of each of the steps 530, 540, and 550 is the new probabilities $p_t(i)$ associated with initial quantile estimates $S_{t-1}(i)$. The combination of the initial quantile estimates $S_{t-1}(i)$ and the associated new probabilities $p_t(i)$ provides the new distribution function $\hat{F}_t$. From steps 530, 540, and 550, method 500 ends (i.e., method 500 exits to step 210 of method 200, at which point an approximation of the new distribution function $\hat{F}_t$ is generated using linear interpolation).

Although primarily depicted and described herein with respect to an embodiment in which the extended version of the SA-based incremental quantile estimation capability supports a set of data records that includes insertion records, deletion records, and updated records, other embodiments of the extended version of the SA-based incremental quantile estimation capability may support sets of data records that include other types and/or combinations of records (e.g., where the set of data records includes insertion records and deletion records, where the set of data records includes insertion records and update records, and the like). In one embodiment, the types of records that are included in the set of data records for which the SA-based incremental quantile estimation capability is implemented may be dependent on the application for which the SA-based incremental quantile estimation capability is used (e.g., database applications, networking applications, and the like).

The SA-based incremental quantile estimation capability depicted and described herein for multiple-record-type implementations may utilize multiple types of weights $w_t$ in updating the initial distribution function to form the new distribution function. For example, the weights $w_t$ may be diminishing (e.g., $w_t = 1/t$) or constant ($w_t = w$), or set in any other suitable manner.

For diminishing weights $w_t$ set as $w_t = 1/t$, it will be appreciated that $D_t$ is the ratio of deletes in the data. Assuming that this is true for t−1, and further assuming that there are k deletions, then, with the arrival of insertion data value $x_t$, by 16, $\hat{F}_t(x)$ is the weighted sum of $\hat{F}_{t-1}(x)$ and $I(x \geq x_t)$ with weights $(t-k-1)/(t-k)$ and $1/(t-k)$, and $D_t = k/(t+1)$ is actually the ratio of deletes in the data up to time t. It also will be appreciate that this may be verifies for the deletion and updated equations (17 and 18). In one such embodiment, the actual weight given to $x_t$ is $1/(t-k)$, not the intended weight $1/t$.

For constant weights $w_t$ set as $w_t = w$ (where w is positive), let $s_1 < s_2 < \ldots < s_k$ be the index of the data that are deleted until time t, where k is the total number of deletes before time t. With the arrival of insertion data value $x_t$, it can be shown that $D_t = (1-w)^{t-s_1-1}w + (1-w)^{t-s_2-1}w + \ldots + (1-w)^{t-s_k-1}w$.

It will be appreciated that the weights $w_t$ used in updating the initial distribution function to form the new distribution function may be set in any other suitable manner.

With respect to the SA-based incremental quantile estimation capability depicted and described herein for multiple-record-type implementations, in the case of deletions and updates for stationary data that will result in equilibrium, for example, when the deletes occurs at a lag with a stationary random distribution, the estimated quantiles converge to the true quantiles. A heuristic understanding of this convergence is that our insertion, deletion, and update equations depicted and described herein are designed in such a way that the effect of deleted data is diminished in the functional approximation of $\hat{F}_t(x)$, and thus quantiles of the remaining data will have the correct quantiles.

It will be appreciated that the modified/additional embodiments that are described with respect to the single-record-type implementations of the SA-based incremental quantile estimation capability also apply to the multiple-record-type implementations of the SA-based incremental quantile estimation capability (e.g., batch processing of insertion records, support for both continuous and discrete distribution functions, and the like, as well as various combinations thereof).

Figure 6:
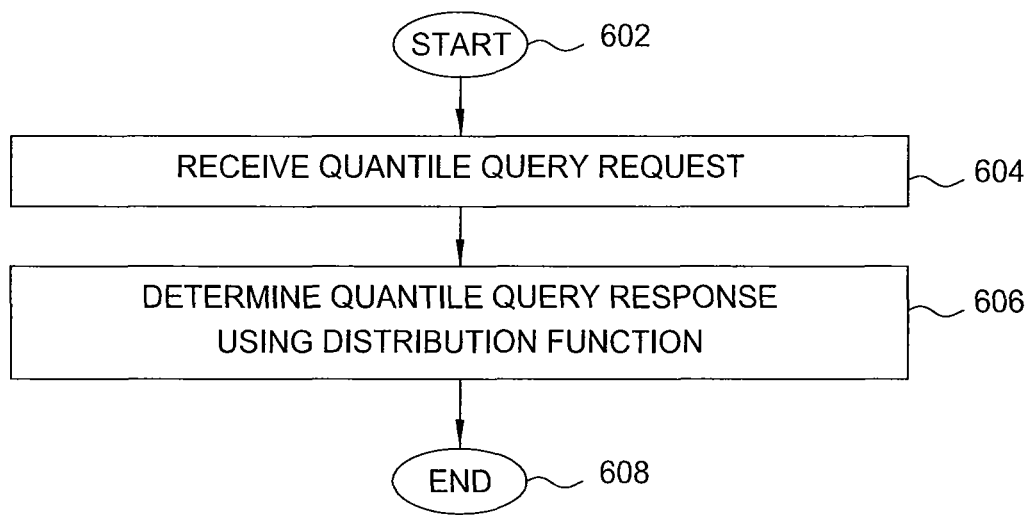
FIG. 6 depicts one embodiment of a method for responding to queries using a distribution function for which the quantile estimates are incrementally tracked.

FIG. 6 depicts one embodiment of a method for responding to queries using a distribution function for which the quantile estimates are incrementally tracked. Although primarily depicted and described herein as being performed serially, at least a portion of the steps of method 600 may be performed contemporaneously, or in a different order than depicted and described with respect to FIG. 6.

At step 602, method 600 begins.

At step 604, a quantile query request is received.

The quantile query request may be any quantile query request. For example, the quantile query request may be a request for a quantile for a specific value, a request for a quantile for a range of values (e.g., for a portion of a bin, multiple bins, a range of values spanning multiple bins, and the like, as well as various combinations thereof).

The quantile query request may be received from any source. For example, the quantile query request may be received locally at the system performing incremental quantile estimation, received from a remote system in communication with the system performing incremental quantile estimation, and the like, as well as various combinations thereof.

The quantile query request may be initiated in any manner. For example, the quantile query request may be initiated manually by a user, automatically by a system, and the like, as well as various combinations thereof.

At step 606, a quantile query response is determined using a distribution function. As described herein, the distribution function is being updated in real time or near real time as data values are being received and, thus, the distribution function provides an accurate estimate of the current view of the quantile distribution. Thus, the quantile query response provides a current value of the quantile of the data value(s) for which the quantile query request was initiated.

At step 608, method 600 ends.

Although primarily described herein such that the distribution functions are said to include a plurality of quantile estimates and an associated plurality of probabilities, it will be appreciated by those skilled in the art and informed by the teachings herein that the distribution functions also may be said to be represented by a plurality of quantile estimates and an associated plurality of probabilities (as well as the associated derivative estimates associated with the quantile estimates).

Although depicted and described as ending (for purposes of clarity), it will be appreciated that method 600 of FIG. 6 may be executed as often as desired/necessary for the application for which the incremental quantile estimation capability is being used.

Figure 7:
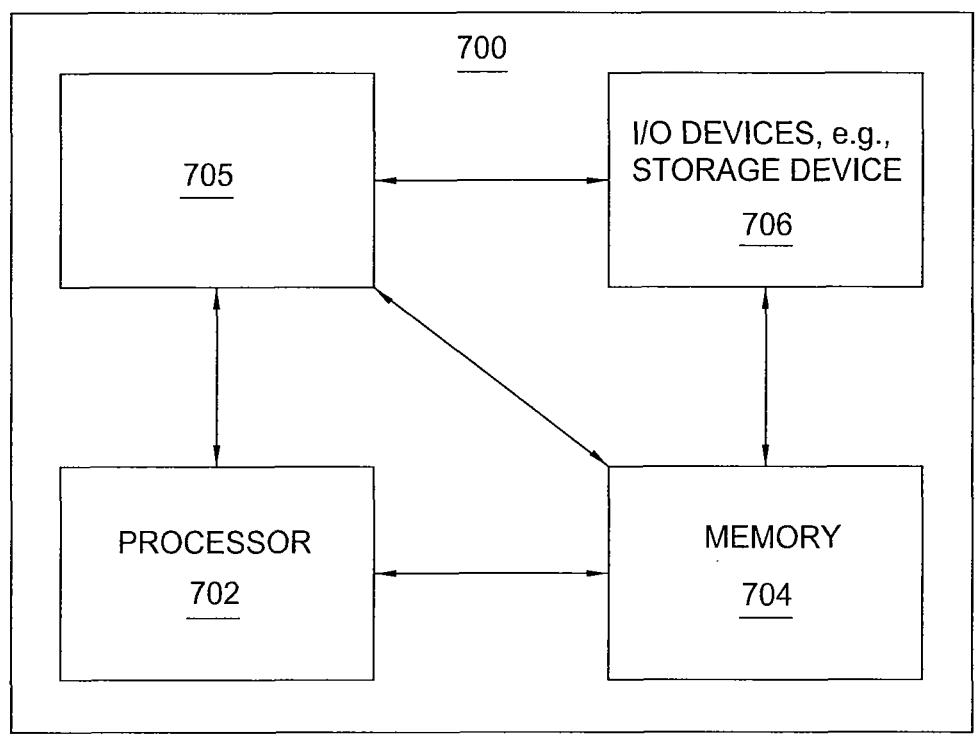
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a incremental quantile estimation module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the incremental quantile estimation process 705 can be loaded into memory 704 and executed by processor 702 to implement the functions as discussed above. As such incremental quantile estimation process 705 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
generating, using a processor, an approximation of a quantile distribution function by connecting a pair of adjacent quantile points using linear interpolation;
wherein the pair of adjacent quantile points comprises:
a first quantile point having a first quantile estimate and a first probability associated therewith; and
a second quantile point having a second quantile estimate and a second probability associated therewith; and
wherein generating the approximation of the quantile distribution function comprises:
defining a right quantile point to the right of the first quantile point in the quantile distribution function;
defining a left quantile point to the left of the second quantile point in the quantile distribution function; and
connecting the first quantile point, the right quantile point, the left quantile point, and the second quantile point using linear interpolation.

2. The method of claim 1, wherein the right quantile point is defined using $\text{right}_t(i)=(S_{t-1}(i)+\Delta_t(i), p_t(i)+f_{t-1}(i)\Delta_t(i))$, wherein:
$S_{t-1}(i)$ is the first quantile estimate associated with the first quantile point;
$p_t(i)$ is the first probability associated with the first quantile estimate of the first quantile point;
$f_{t-1}(i)$ is a density estimate associated with the first quantile estimate of the first quantile point; and
$\Delta_t(i)$ is a monotonicity value.

3. The method of claim 1, wherein the left quantile point is defined using $\text{left}_t(i+1)=(S_{t-1}(i+1)-\Delta_t(i), p_t(i+1)-f_{t-1}(i+1)\Delta_t(i))$, wherein:
$S_{t-1}(i+1)$ is the second quantile estimate associated with the second quantile point;
$p_t(i+1)$ is the second probability associated with the second quantile estimate of the second quantile point;
$f_{t-1}(i+1)$ is a density estimate associated with the second quantile estimate of the second quantile point; and
$\Delta_t(i)$ is a monotonicity value.

4. The method of claim 1, wherein the first quantile point and the right quantile point are connected linearly, the right quantile point and the left quantile point are connected linearly, and the left quantile point and the second quantile point are connected linearly.

5. The method of claim 1, wherein generating the approximation of the quantile distribution function comprises:
computing a monotonicity value $\Delta_t(i)$ using:

$$\Delta_t(i) = \min\left(\frac{S_{t-1}(i+1) - S_{t-1}(i)}{2}, \frac{p_t(i+1) - p_t(i)}{f_{t-1}(i) + f_{t-1}(i+1)}\right),$$

wherein:
$S_{t-1}(i)$ is the first quantile estimate associated with the first quantile point;
$p_t(i)$ is the first probability associated with the first quantile estimate of the first quantile point;
$f_{t-1}(i)$ is a first density estimate associated with the first quantile estimate of the first quantile point;
$S_{t-1}(i+1)$ is the second quantile estimate associated with the second quantile point;
$p_t(i+1)$ is the second probability associated with the second quantile estimate of the second quantile point; and
$f_{t-1}(i+1)$ is a second density estimate associated with the second quantile estimate of the second quantile point.

6. The method of claim 1, further comprising:
prior to generating the approximation of the quantile distribution function:
generating the quantile distribution function by updating an initial quantile distribution function based on a received data value.

7. The method of claim 6, wherein the initial quantile distribution function comprises a first initial quantile estimate having a first initial probability associated therewith, wherein updating the initial quantile distribution function comprises:
determining a second initial probability associated with the first initial quantile estimate.

8. The method of claim 7, wherein determining the second initial probability associated with the first initial quantile estimate comprises:
evaluating $p_t(i)=(1-w_t) p_{t-1}(i)+w_t I(S_{t-1}(i) \geq x_t)$ for the first initial quantile estimate, wherein:
$x_t$ is the received data value;
$w_t$ is a weight associated with the received data value;
$S_{t-1}(i)$ is the first initial quantile estimate;
$p_{t-1}(i)$ is the first initial probability associated with the first initial quantile estimate;
$I(S_{t-1}(i) \geq x_t)$ is an indicator function; and
$p_t(i)$ is the second initial probability associated with the first initial quantile estimate.

9. The method of claim 1, further comprising:
determining an updated first quantile estimate associated with the first probability based on the approximation of the quantile distribution function.

10. The method of claim 9, wherein determining the updated first quantile estimate associated with the first probability based on the approximation of the quantile distribution function comprises:
evaluating the approximation of the quantile distribution function using the first probability as an input.

11. The method of claim 9, wherein determining the updated first quantile estimate associated with the first probability based on the approximation of the quantile distribution function comprises:
evaluating $\hat{F}_t(S_t(i))=p_i$, wherein
$\hat{F}_t$ is the approximation of the quantile distribution function;
$S_t(i)$ is the updated first quantile estimate; and
$p_i$ is the first probability.

12. The method of claim 1, wherein the quantile distribution function has a first density estimate associated therewith, wherein the first density estimate is associated with the first quantile point, wherein the method further comprises:
updating the first density estimate of the quantile distribution function to form a second density estimate using $f_t(i)=(1-w_t)f_{t-1}(i)+w_t I(|x_t-S_t(i)| \leq c / \{2c\})$, wherein:
$x_t$ is a received data value;
$w_t$ is a weight associated with the received data value;
$S_t(i)$ is the first quantile estimate associated with the first quantile point;
$f_{t-1}(i)$ is the first density estimate associated with the first quantile point;
$I(|x_t-S_{t-1}(i)| \leq c)$ is an indicator function;
c is a tunable parameter representing a window size; and
$f_t(i)$ is the second density estimate.

13. The method of claim 1, further comprising:
prior to generating the approximation of the quantile distribution function:
generating the quantile distribution function by updating an initial quantile distribution function based on a received data value, wherein the initial quantile distribution function comprises a first initial quantile estimate having a first initial probability associated therewith, wherein updating the initial quantile distribution function comprises determining a second initial probability associated with the first initial quantile estimate.

14. A non-transitory computer-readable storage medium storing instructions which, when executed by a computer, cause the computer to perform a method, the method comprising:
generating an approximation of a quantile distribution function by connecting a pair of adjacent quantile points using linear interpolation;
wherein the pair of adjacent quantile points comprises:
a first quantile point having a first quantile estimate and a first probability associated therewith; and
a second quantile point having a second quantile estimate and a second probability associated therewith; and
wherein generating the approximation of the quantile distribution function comprises:
defining a right quantile point to the right of the first quantile point in the quantile distribution function;
defining a left quantile point to the left of the second quantile point in the quantile distribution function; and
connecting the first quantile point, the right quantile point, the left quantile point, and the second quantile point using linear interpolation.

15. An apparatus, comprising:
a processor and a memory communicatively connected to the processor, the processor configured to:
generate an approximation of a quantile distribution function by connecting a pair of adjacent quantile points using linear interpolation;
wherein the pair of adjacent quantile points comprises:
a first quantile point having a first quantile estimate and a first probability associated therewith; and a second quantile point having a second quantile estimate and a second probability associated therewith; and wherein the processor is configured to generate the approximation of the quantile distribution function by:

defining a right quantile point to the right of the first quantile point in the quantile distribution function;

defining a left quantile point to the left of the second quantile point in the quantile distribution function; and connecting the first quantile point, the right quantile point, the left quantile point, and the second quantile point using linear interpolation.

* * * * *